DRIVE FOR TAPE TRANSPORT

Filed March 10, 1966 2 Sheets-Sheet 1

March 7, 1967 K. FABER 3,307,796

DRIVE FOR TAPE TRANSPORT

Filed March 10, 1966 2 Sheets-Sheet 2

United States Patent Office
3,307,796
Patented Mar. 7, 1967

3,307,796

DRIVE FOR TAPE TRANSPORT

Karl Faber, Oftersheim, Baden, Germany, assignor to Brown, Boveri & Cie Aktiengesellschaft, Mannheim-Kafertal, Germany, a corporation of Germany Filed Mar. 10, 1966, Ser. No. 535,296
Claims priority, application Germany, Apr. 8, 1965, B 61,412
5 Claims. (Cl. 242—67.4)

My invention relates to tape drive mechanisms. More particularly, it relates to an improved tape drive mechanism for conveying tapes which comprise a sheet material such as paper, or which comprise film.

In various types of teaching apparatus, there is quite often required the use of a tape, suitably of paper, on which there is recorded information in the form of visual illustrations. In such apparatus there is generally also required a tape on which the teaching program is recorded and a tape upon which the student using the apparatus may record written material such as answers to questions in the teaching program, and the like. All of these tapes are generally conveyed in tape transport devices comprising respectively feed and takeup reels. The tapes on which teaching or learning information is recorded suitably should be capable of being conveyed readily in both the forward and reverse directions, of being halted at appropriate points, and of being operated independently of each other. The halting of tape movements may be effected manually, by electrical switches which energize or deenergize the tape drive mechanism, or by automatic electrical control such as by electromechanical or electronic devices which are actuated in response to the energization of sensing devices which are operated in response to chosen disposition of perforations along the edges of the tapes. With the use of such sensing devices, coordination of an information-containing tape and a program tape may be effected, i.e., a visual information section on an information tape may be presented in accordance with a chosen teaching step on the teaching program tape.

In the system detailed immediately hereinabove, the transport mechanism for the tapes has the task of moving independently, two tapes, both in the forward and reverse directions respectively. Suitably, such mechanism should only require one motor drive in the interests of efficiency, weight, space requirement, and economy. It should also be readily adaptable to handling more than two tapes, i.e., it should be able to effect the independent forward and reverse movements of three and four tapes with a single centrally located drive.

Such single motor with its associated central drive needn't be limited to use in teaching apparatus. Other systems which comprise a plurality of individual tape transport devices may also be used in an arrangement where each of the latter devices is coupled to the central drive but is operated independently of the other devices, examples of such other systems being information systems, recording and communication systems, registering systems, and the like.

It is an important object of this invention to provide an improved drive for enabling the independent handling of a plurality of tape transports.

This object is achieved by an arrangement in which a takeup reel of the information tape is being driven whereby the feed reel of such tape unwinds freely as it follows the pull of the tape. In order to enable a forward and reverse run of either reel in the tape transport, one or the other reel has to be connected to the drive as a takeup reel.

An electric motor is provided having an intermediate drive gear which effects a reduction in the number of rotations, such intermediate drive suitably being of the friction type. The intermediate drive gear transfers the rotational movement produced by the energization of the motor to a clutch drive disc by means of belts, for example. Such clutch drive disc acts upon a double clutch to the left or to the right or to both sides, depending upon whether a left, a right or both a left and right tape transport device is to be operated, such double clutch being coupled in the axial direction. The double clutch comprises drive discs which are tightly connected with the axles of the respective reels to which they are to impart movement and drive such reels directly. In addition, the respective drive discs of the double clutch operate the pulley belt of the oppositely disposed reel by means of straps. A friction slip clutch and a directionally ratched ratchet wheel or a free wheel are positioned axially with respect to this pulley. A rotational count transmission is connected with the belt transmission to the reel driving discs, such transmission being equal to at least the largest tape reel diameter ratio of the reel windings, i.e., the reel must be rotated at a greater velocity by the factor resulting from the ratio of the largest to the smallest diameter of the tape winding.

Generally speaking and in accordance with the invention, there is provided a drive arrangement for independently respectively moving tape in a pair of tape transport devices in parallel paths in both the forward and reverse directions, each of the transport devices comprising a pair of reels, each of the reels in a transport device being adapted to function both as a feed reel and a takeup reel. The arrangement comprises a drive motor capable of being rotated in respective opposite rotational directions, a bilateral clutch, and means for selectively transferring rotational movement from the motor through the bilateral clutch to corresponding ones of the pairs of reels respectively to cause the tape to be wound on the aforesaid one reels when the movement is in a given direction, the tape being concurrently unwound from the corresponding others of the pairs of reels by the pulling force of moving tape. Respective ratchet wheels are provided associated with each of the other of the pairs of reels, there being included movement for coupling the motor movement through said bilateral clutch to the ratchet wheels. The ratchet wheels are arranged to rotate in a free wheeling direction at a velocity which exceeds the unwinding velocity of the other wheels whereby the rotation of the ratchet wheels in the free wheeling direction has no influence on the unwinding in the aforesaid given direction. Means are provided, associated with the ratchet wheels and the other reels, for imparting the movement of the ratchet wheels to the other reels when the ratchet wheels have transferred thereto movement of the motor through the bilateral clutch in a direction opposite to the given direction, whereby tape is wound on the other reels and unwound from the one reels.

The foregoing and more specific objects and features of my invention will be apparent from and will be mentioned in the following description of a drive for a tape transport shown by way of example in the accompanying drawing.

In the drawing, FIG. 1 is a plan view of an illustrative embodiment of a drive for a tape transport constructed in accordance with the principles of the invention;

Figure 1:
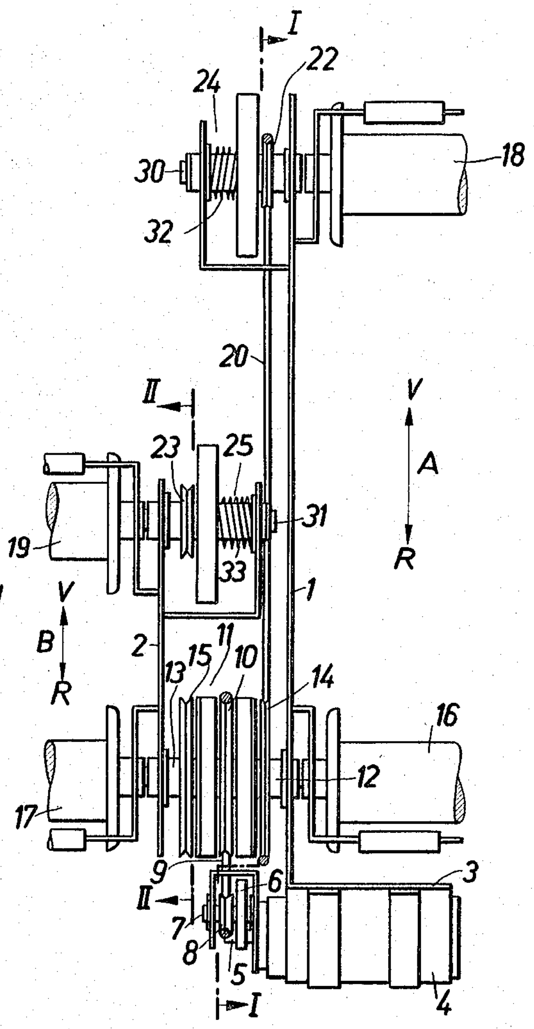
Figure 2:
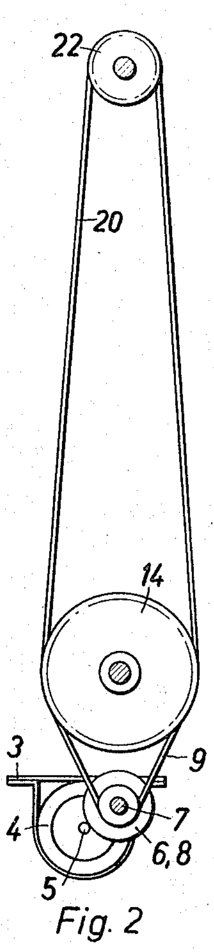
FIG. 2 is a section taken along line I—I of FIG. 1 looking in the direction of the arrows.

Referring now to the figures, the outer frame of the gearing unit set is essentially formed by the two side plates 1 and 2 (FIG. 1) respectively which suitably may be strong metal plates. Plate 1 is suitably squared off at its side which is viewed in the drawing and has an extending portion 3 perpendicular to its main portion which carries the drive motor 4. The motor shaft 5 as shown in FIG. 2 is in frictional contact with a disc 6. The reduction in speed to be obtained by such frictional contact with disc 6 is selected in accordance with the transportation velocity of the tape which carries information in the teaching apparatus. On the same shaft 7 upon which friction disc 6 is mounted is a pulley 8 fixedly mounted on shaft 7. Disc 6 and pulley 8 may preferably be segments. Belts 9 effect the transfer of rotational movement to the clutch drive disc of a double clutch 11 which may suitably be of the electromagnetic type and which may selectively couple the rotational motion to transport devices A and B. Clutch 11 thereby is designed such that transport devices A and B may also be coupled simultaneously. The coupling operating discs 14 and 15 which are fixedly disposed on the reel axle 12, 13 are placed into rotational movement upon the operating of the appropriate coupling side with its axially adjacent reel.

Figure 3:
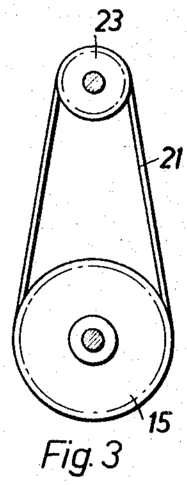
FIG. 3 is a section taken along line II—II of FIG. 1 looking in the direction of the arrows.
Figure 5:
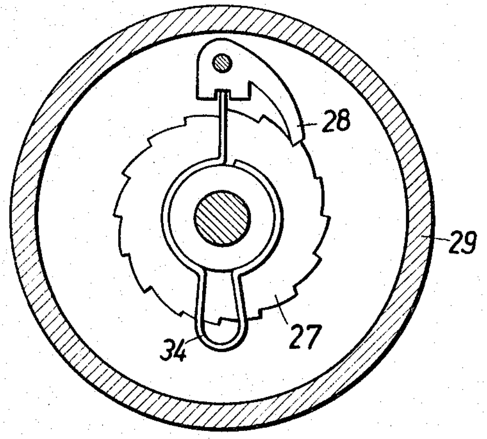
FIG. 5 is a view taken along lines I—I of FIG. 4 looking in the direction of the arrows.
Figure 4:
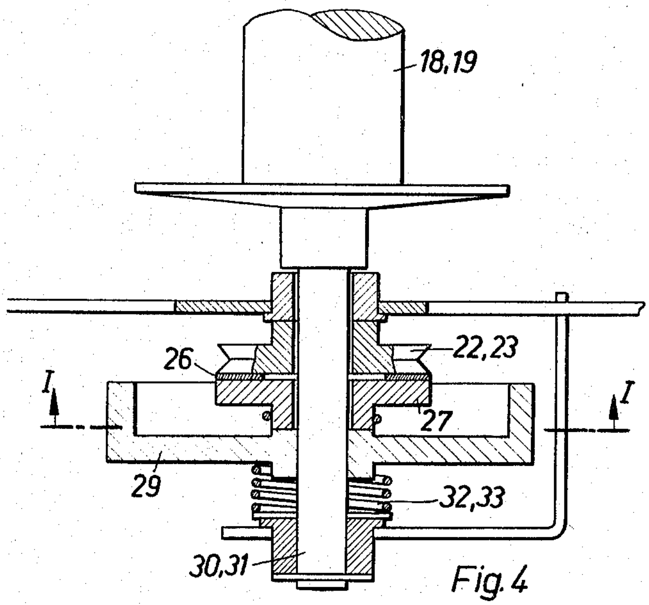
FIG. 4 is a sectional view of an equalizing clutch utilized in the drive shown in FIGS. 1–3.

The two transport devices for the respective information carrying tapes which at one time may be wound on reels 17 and 19 and at another time on reels 16 and 18 are indicated by arrows which are legended with the notations V and R respectively. The friction is determined by the rotational direction of the motor. To select the direction V or R, there is merely required a reverse poling of the motor. If, for example, direction R is selected, then reels 17 and 16 respectively are the takeup or winding reels and reels 18 and 19 are, in this situation, the feed or unwinding reels. When either or both of reels 16 or 17 are being so wound, the corresponding respective unwinding reels 18 or 19 are also caused to rotate by the pulling effect of the tapes being unwound therefrom. Concurrently, transfer of rotational motion occurs over belts 20 or 21 (FIG. 3) to pulleys 22 and 23 which are loosely mounted on the reel axles and also upon the equalizing clutches 24 and 25 which are axially disposed adjacent reels 18 and 19 respectively. Thereby, the rotational movement is transmitted through a friction layer 26 to a toothed disc 27 of a directional ratchet (FIG. 4). The respective ratios of the numbers of revolutions of the belt pulleys 14 and 15 to pulleys 22 and 23 respectively effects an operation in which the ratchet wheel 27 (FIG. 5) rotates at a velocity greater than that of the unwinding reels which are rendered rotational by the pull of the tapes being unwound therefrom. The unwinding reels are thus rotated only through the action of the pull of the tapes thereon. Ratchet wheel 27 runs ahead of such unwinding reel movement and therefore has no influence thereon.

During the operation of a transport in the V direction, ratchet wheel 27 carries along disc 29 through a latch lever 28. Disc 29 is tightly affixed to the reel axle 30, 31 and carries along reels 18 and which, at this juncture, function as winding, i.e., takeup reels. The feed or unwinding reels are also driven, although at a slower rate and in accordance with the transmission ratio. With this arrangement, there is created a stronger pull of tape on reels 18 and 19 and results in a slipping at the friction layer 26 of the friction clutch and thereby to an adjustment of the differences in the numbers of rotations. The pressure forces necessary for the friction clutches are provided by pressure springs 32 and 33. A spring 34 operates in a conventional manner to silence the noise of the ratchet wheel which is effected by the raising of latch lever 28 from ratchet wheel 27 in the free wheeling direction and maintaining it in this position for the duration of the rotational movement.

The above described device operates as follows:

1. *Operation in one rotational direction*

The rotational direction of the motor is such that the reel which is axially arranged with the double-clutch functions as a winding or takeup reel. This reel is operated with an additionally connected clutch and places in motion the information tape to be transported. The movement of the latter tape causes the rotation of the feed or unwinding reel. Concurrently, transmission of rotational movement takes place, by way of the respective operating drive belt, in the gear parts which are arranged axially with the unwinding or feed reel whereby the gear wheel of a directionally ratched or a free wheel is rotated through the slip clutch, the latter wheel rotating in its free wheeling state at a velocity greater than the rotational velocity of the unwinding reel, i.e., it runs ahead of the reel rotation caused by the pull of the unwinding tape and thereby does not influence the rotational movement of the unwinding reel.

2. *Operation in the counter-rotational direction*

The rotational direction of the motor is opposite to that in the operation as described immediately hereinabove. In this mode of operation, the reel which is axially arranged with the directionally ratched wheel and the slip clutch is a winding or takeup wheel. In accordance with the above described transmission, the last named reel is operated as the feed or unwinding reel in this mode of operation. Concurrently, a transmission is effected through the paper tape. In accordance with the difference in respective numbers of rotations, i.e., rotational velocities, which depends upon the difference of the diameters in the tape rollers, a tractional force is provided from the unwinding reel which acts upon the slip clutch through the winding reel and effects a balance in the rotational movements at this juncture.

Thus, only a pole reversing in the motor is necessary to produce one or the other movement direction for the tape. Thus, other than a double clutch which has to be provided to enable the selection of any one of two transport devices, no other clutches need be operated at the reversal of the direction of movement of the tape in connection with the difference in rotational velocity since the latter difference is automatically adjusted by the action of a free wheel and a slip clutch.

In order to ensure the aforedescribed operational conditions, a braking of the reels is also necessary. Such braking can be effected by appropriate springs which increase the friction torque of the coils. The central double clutch which is disposed between the drives may be a mechanically acting clutch which may be operated by mechanical or electromagnetic means, an electromagnetic clutch being the preferred type. This clutch also enables the drive to be rapidly brought to a halt, such rapid action being necessary where a control is effected by sensing stations which are energized through perforations in the tape.

It will be obvious to those skilled in the art upon studying this disclosure that drives for tape transports according to my invention permit of a great variety of modifications and hence can be given embodiments other than those particularly illustrated and described herein without departing from the essential features of my invention and within the scope of the claims annexed hereto.

I claim:

1. A drive arrangement for independently respectively moving tape in a pair of tape transport devices in parallel paths in both the forward and reverse directions, each of said transport devices comprising a pair of reels, each of the reels in a transport device being adapted to function both as a feed and a takeup reel comprising; a drive motor capable of being rotated in respective opposite rotational directions, a bilateral clutch, means for selectively transferring rotational movement from said motor through said bilateral clutch to corresponding ones of said pairs of reels respectively to cause said tape to be wound on said one reels when said movement is in a given direction, said tape being concurrently unwound from the corresponding others of said pairs of reels by the pulling force of said moving tape, a ratchet wheel associated with each of said other reels respectively, means for coupling the motor movement through said bilateral clutch to said ratchet wheels, said ratchet wheels being arranged to rotate in the free wheeling direction when tape is wound on said one reels at a velocity which exceeds the unwinding velocity of said other wheels whereby the rotation of said ratchet wheels in the free wheeling direction has no influence on said unwinding in said given direction, means associated with said ratchet wheels and said other reels for imparting the movement of said ratchet wheels to said other reels when said ratchet wheels have transferred thereto movement from said motor through said bilateral clutch in a direction opposite to said given direction, whereby tape is wound on said other reels and unwound from said one reels.

2. A drive as defined in claim 1 wherein said means for coupling said movement to said ratchet wheels comprises respective equalizing clutches having respective ratchet pulley wheels, respective friction layers, intermediate said ratchet wheels and said ratchet pulley wheels, respective clutch discs on each side of said bilateral clutch and respective pulley belts connecting each of said clutch discs with a corresponding ratchet pulley wheel, said equalizing clutches transferring movement from said ratchet wheel to said other reels respectively.

3. A drive as defined in claim 2 wherein the ratio of the rotational velocities of said bilateral clutch discs and said ratchet pulley wheels is at least equal to the ratio of the diameters of the reels of a transport device.

4. A drive as defined in claim 3 and further including respective tensioning means for providing a bearing pressure on said equalizing clutches.

5. A drive as defined in claim 1 wherein said bilateral clutch is of the electromagnetic type.

References Cited by the Examiner

UNITED STATES PATENTS

| | | | |
|---|---|---|---|
| 2,705,599 | 4/1955 | McCollough | 242—55.12 |
| 3,153,862 | 10/1964 | Sawyer | 35—9 |

FRANK J. COHEN, *Primary Examiner.*

L. D. CHRISTIAN, *Assistant Examiner.*